(12) United States Patent
Wang et al.

(10) Patent No.: US 12,596,184 B2
(45) Date of Patent: Apr. 7, 2026

(54) LIDAR, CONTROL METHOD OF LIDAR, AND ADDRESSING CIRCUIT

(71) Applicant: HESAI TECHNOLOGY CO., LTD., Shanghai (CN)

(72) Inventors: Chenluan Wang, Shanghai (CN); Xuezhou Zhu, Shanghai (CN); Wenyi Zhu, Shanghai (CN); Tingyu Yao, Shanghai (CN); Shaoqing Xiang, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 761 days.

(21) Appl. No.: 18/147,718

(22) Filed: Dec. 29, 2022

(65) Prior Publication Data

US 2023/0152432 A1 May 18, 2023

Related U.S. Application Data

(63) Continuation of application No. PCT/CN2021/105553, filed on Jul. 9, 2021.

(30) Foreign Application Priority Data

Aug. 31, 2020 (CN) .......................... 202010901415.1

(51) Int. Cl.
*G01S 7/497* (2006.01)
*G01S 7/481* (2006.01)

(52) U.S. Cl.
CPC ............ *G01S 7/497* (2013.01); *G01S 7/4815* (2013.01); *G01S 7/4816* (2013.01)

(58) Field of Classification Search
CPC ....... G01S 7/497; G01S 7/4815; G01S 7/4816
See application file for complete search history.

(56) References Cited

U.S. PATENT DOCUMENTS

2020/0264287 A1 8/2020 Graefling et al.
2022/0107420 A1 4/2022 Hiyama et al.

FOREIGN PATENT DOCUMENTS

CN 105591529 A 5/2016
CN 107247269 A 10/2017
(Continued)

OTHER PUBLICATIONS

International Search Report and Written Opinion mailed Oct. 12, 2021, in connection with International Patent Application No. PCT/CN2021/105553, 10 pgs. (including translation).

(Continued)

*Primary Examiner* — Jamil Ahmed
(74) *Attorney, Agent, or Firm* — Chiesa Shahinian & Giantomasi PC; Xuezheng Wang

(57) ABSTRACT

A lidar and a control method of the lidar, and an addressing circuit are provided. The control method of the lidar includes: acquiring an address of a starting group of detection units is paired with a group of activated emitters in the lidar, and generating a corresponding control signal for detection, where the address of the starting group of the detection units is determined based on a result of a calibration process performing a decoding process and a logic operation process on the control signal for detection, determining the address of the corresponding starting group of the detection units that has been processed by the calibration process, and determining addresses of other groups of detection units to be synchronously activated at the same time with the starting group of the detection units, determining a channel selecting address, and generating a selecting and controlling signal for corresponding channels.

11 Claims, 6 Drawing Sheets

(56)            References Cited

FOREIGN PATENT DOCUMENTS

| CN | 107300705 | A |   | 10/2017 | | |
| CN | 110780284 | A | * | 2/2020 | ............ | G01S 7/493 |
| CN | 111596283 | A |   | 8/2020 | | |
| CN | 112965075 | A |   | 6/2021 | | |
| JP | 2019-056569 | A |   | 4/2019 | | |
| WO | 2020/162223 | A1 |   | 8/2020 | | |

OTHER PUBLICATIONS

Office Action mailed Nov. 8, 2024 in connection with Chinese Patent Application No. 202010901415.1, 18 pgs. (including translation).

Office Action mailed Feb. 28, 2025 in connection with Chinese Patent Application No. 202010901415.1, 17 pgs. (including translation).

* cited by examiner

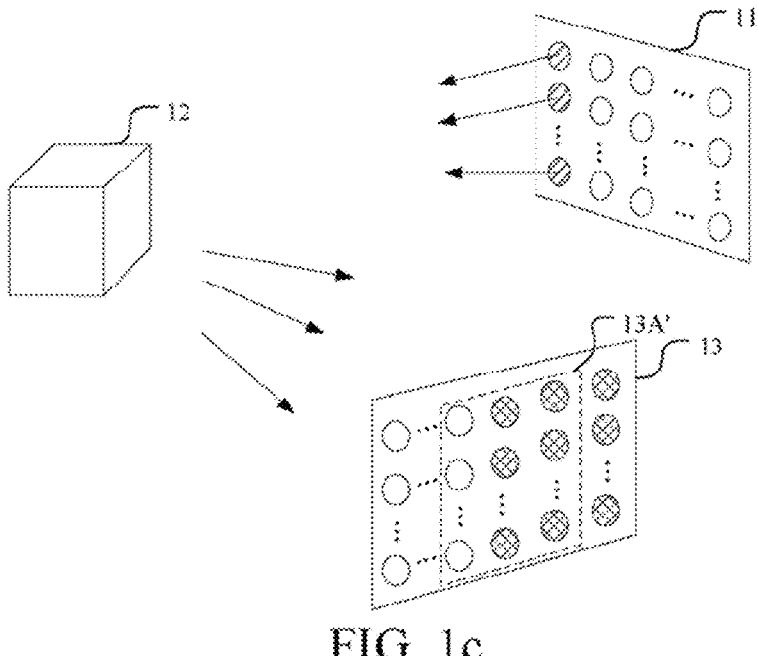

FIG. 1c

| Detection unit array | First Column | Second Column | Third Column | Fourth Column | Fifth Column | Sixth Column | Seventh Column | Eighth Column | Ninth Column | Tenth Column | ··· |
|---|---|---|---|---|---|---|---|---|---|---|---|
| Channel selecting and controlling | Select the first column of detection units to the third column of detection units | | | Select the fourth column of detection units to the sixth column of detection units | | | Select the seventh column of detection units to the ninth column of detection units | | | ··· | |
| Ideal position | A spot corresponding to the first column of emitting units | | | A spot corresponding to the second column of emitting units | | | A spot corresponding to the third column of emitting units | | | ··· | |
| Actual position | | A spot corresponding to the first column of emitting units | | | A spot corresponding to the second column of emitting units | | | A spot corresponding to the third column of emitting units | | | ··· |

FIG. 1d

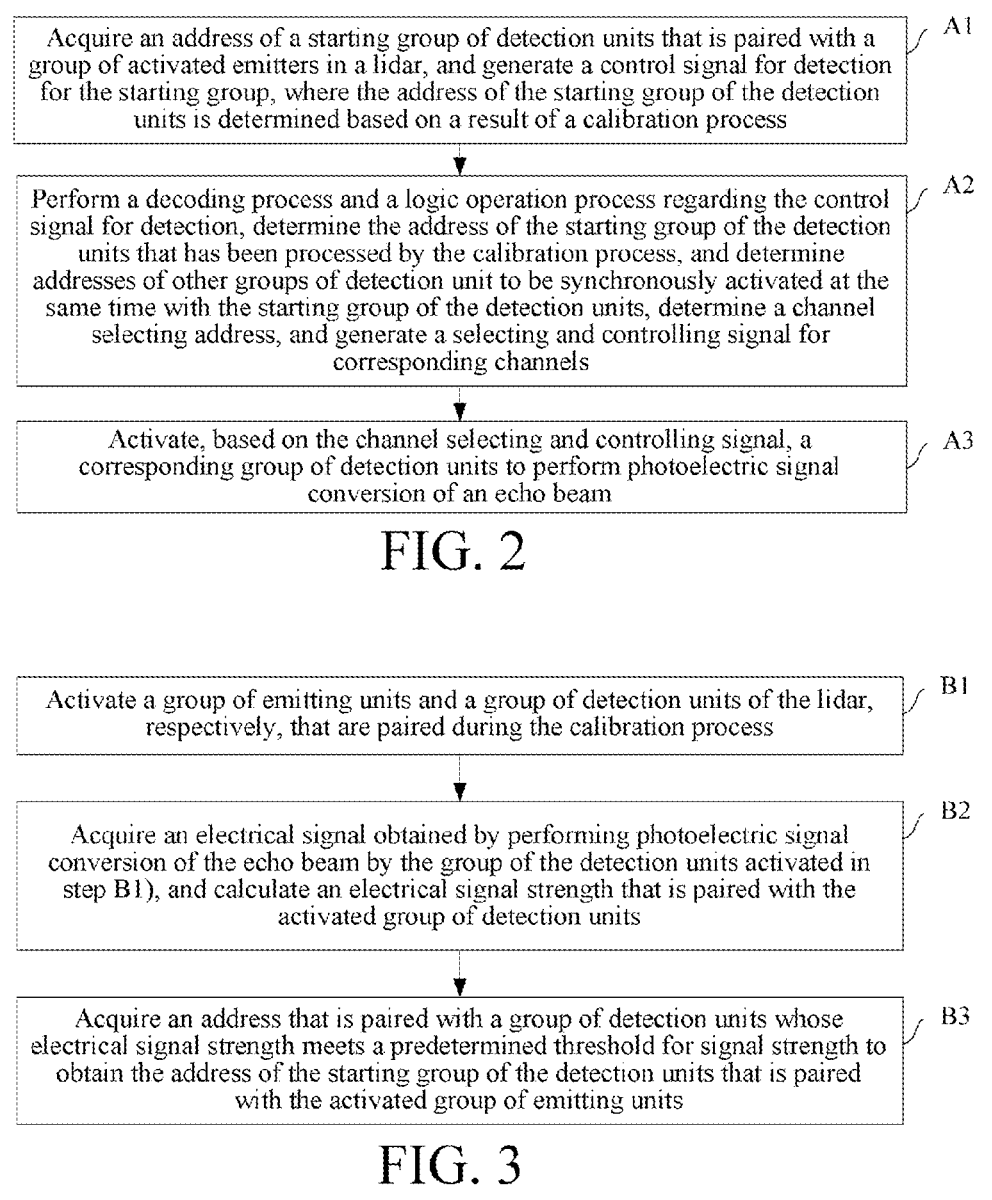

Acquire an address of a starting group of detection units that is paired with a group of activated emitters in a lidar, and generate a control signal for detection for the starting group, where the address of the starting group of the detection units is determined based on a result of a calibration process ⟋ A1

Perform a decoding process and a logic operation process regarding the control signal for detection, determine the address of the starting group of the detection units that has been processed by the calibration process, and determine addresses of other groups of detection unit to be synchronously activated at the same time with the starting group of the detection units, determine a channel selecting address, and generate a selecting and controlling signal for corresponding channels ⟋ A2

Activate, based on the channel selecting and controlling signal, a corresponding group of detection units to perform photoelectric signal conversion of an echo beam ⟋ A3

FIG. 2

Activate a group of emitting units and a group of detection units of the lidar, respectively, that are paired during the calibration process ⟋ B1

Acquire an electrical signal obtained by performing photoelectric signal conversion of the echo beam by the group of the detection units activated in step B1), and calculate an electrical signal strength that is paired with the activated group of detection units ⟋ B2

Acquire an address that is paired with a group of detection units whose electrical signal strength meets a predetermined threshold for signal strength to obtain the address of the starting group of the detection units that is paired with the activated group of emitting units ⟋ B3

FIG. 3

LIDAR, CONTROL METHOD OF LIDAR, AND ADDRESSING CIRCUIT

CROSS-REFERENCE TO RELATED APPLICATIONS

This application is a Continuation of International Patent Application No. PCT/CN2021/105553, filed Jul. 9, 2021, which claims priority to Chinese Patent Application No. 202010901415.1, filed Aug. 31, 2020; the disclosure of all of which are incorporated herein by reference in their entirety.

TECHNICAL FIELD

Embodiments of this disclosure relate to the field of lidar technology, and in particular to a lidar, a control method of the lidar, and an addressing circuit.

BACKGROUND

An emitting module in a lidar emits a laser beam and a receiving module detects the laser beam reflected by a target object (that is, an echo beam). Then an optical signal detected by the receiving module is converted into an electrical signal and point cloud data can be obtained after data processing.

When lidar hardware is assembled, a channel selecting and controlling solution between the emitting module and the receiving module may be determined through a light alignment operation, so that a photoelectric detection region with the optimal light alignment effect of the receiving module may be activated to perform echo detection.

However, a machining error in a production stage can cause misalignments between the fields of view of the emitting module and the receiving module. As a result, the activated photoelectric detection region of the receiving module fails to be aligned with the echo beam, resulting in the loss of an optical signal of the echo beam. Although the misalignment between the fields of view of the emitting module and the receiving module may be reduced by improving the machining precision in the production stage, a requirement for the accuracy of the light alignment operation is very strict, which is difficult to be implemented in an actual production process.

In addition, the channel selecting and controlling solution determined during assembling represents an ideal solution, and the internal parts of the lidar may be disturbed when the lidar is in operation. Consequently, the misalignment between the fields of view occurs between the emitting module and the receiving module. As a result, the photoelectric detection region activated of the receiving module fails to be aligned with the echo beam, resulting in the loss of the optical signal of the echo beam.

SUMMARY

Technical Problem

Therefore, how to resolve the problem of the loss of the optical signal to be detected by the receiving module becomes an urgent problem for a person skilled in the art.

Technical Solution

In view of this, embodiments of this disclosure provide a lidar, a control method of the lidar, and an addressing circuit, improving the accuracy of echo detection performed by the lidar, and effectively ensuring the integrity of data for echo detection.

Embodiments of this disclosure provide a control method of a lidar, including: A1) acquiring an address of a starting group of detection units that is paired with a group of activated emitters in the lidar, and generating a control signal for detection for the starting group, where the address of the starting group of the detection units is determined based on a result of a calibration process; A2) performing a decoding process and a logic operation process regarding the control signal for detection, determining the address of the starting group of the detection units that has been processed by the calibration process, and determining addresses of other groups of detection units to be synchronously activated at the same time with the starting group of the detection units, determining a channel selecting address, and generating a selecting and controlling signal for corresponding channels; and A3) activating, based on the channel selecting and controlling signal, a corresponding group of detection units to perform photoelectric signal conversion of an echo beam.

Optionally, the calibration process includes the following method steps: B1) activating a group of emitting units and a group of detection units of the lidar, respectively, that are paired during the calibration process; B2) acquiring an electrical signal obtained by performing photoelectric signal conversion of the echo beam by the group of the detection units activated in step B1), and calculating an electrical signal strength that is paired with the activated group of detection units; and B3) acquiring an address that is paired with a group of detection units whose electrical signal strength meets a predetermined threshold for signal strength to obtain the address of the starting group of the detection units that is paired with the activated group of emitting units.

Optionally, the step B3) includes: B31) sequentially determining, based on a predetermined sequence for reading signals, whether the electrical signal strength that is paired with the activated group of detection units meets the predetermined threshold for signal strength; and B32) determining an address that is paired with a group of detection units through which converted first electrical signal strength meets the predetermined threshold for signal strength to obtain the address of the starting group of the detection units that is paired with the activated group of emitting units.

Optionally, before performing the calibration process, the method further includes: determining that a predetermined condition for calibration is met.

Embodiments of this disclosure further provide an addressing circuit of a lidar, and the addressing circuit includes a decoding module and a combination logic module. The decoding module is configured to perform a decoding process regarding a received control signal for detection, determine an address of a starting group of a detection unit that has been processed by a calibration process that is paired with the control signal for detection, and transmit a corresponding decoding signal to the combination logic module, where the control signal for detection is generated based on the address of the starting group of the detection units that is paired with a group of emitting units activated in the lidar, and the address of the starting group of the detection units is determined based on a result of a calibration process. The combination logic module is configured to perform a logic operation process regarding a received decoding signal, determine addresses of other groups of detection units to be synchronously activated at the same time with the starting group of the detection units, form a channel selecting address with the address of the starting group of the detection units, and output a corresponding channel selecting and controlling signal to a receiving module of the lidar to control activation of a corresponding group of detection units in the receiving module.

Optionally, the decoding module includes a plurality of input ports and a plurality of output ports. Signals received in parallel through each input port are utilized as the control signal for detection. A decoding process is performed on the control signal for detection to determine an address of a starting group of detection units that needs to be activated that is paired with the control signal for detection, and then a corresponding decoding signal is transmitted to the combination logic module. The combination logic module includes a plurality of input ports and a plurality of output ports, the plurality of input ports of the combination logic module are respectively connected with different output ports of the decoding module, and the plurality of output ports of the combination logic module are respectively connected with enabling ports of different groups of detection units. The combination logic module performs a logic operation process regarding the decoding signal outputted by the decoding module, determines the addresses of the other groups of detection units to be synchronously activated at the same time with the starting group of the detection units, forms the channel selecting address with the address of the starting group of the detection units, and outputs the selecting and controlling signal for corresponding channels to the receiving module of the lidar.

Optionally, the combination logic module includes a plurality of OR gates, and each OR gate respectively includes the plurality of input ports and an output port. An input port of each OR gate is used as the input port of the combination logic module and is connected with an output port of the decoding module at the corresponding position, and according to a connection sequence of the output port of the decoding module, other different input ports of each OR gate are further respectively connected with first x−1 output ports of the decoding module at the corresponding position; and as the output port of the combination logic module, the output port of each OR gate is respectively connected with a group detection units, where x represents a quantity of groups of detection units to be synchronously activated.

Optionally, one or more input ports of the plurality of OR gates that are not connected with the output port of the decoding module are all connected at a voltage of a low level.

Optionally, the lidar includes: n groups of detection units, where n=p*x+q, both p and q represent positive integers, p represents a quantity of output ports of the addressing circuit, and q≥0.

Embodiments of this disclosure further provide a lidar, including: a control module, an emitting module, a receiving module, and an addressing circuit, where the emitting module includes a plurality of groups of emitting units, and the receiving module includes a plurality of groups of detection units. The control module is configured to generate an emitting control signal and transmit the emitting control signal to the emitting module; and according to an address of a starting group of detection units that is paired with an activated group of emitting units, generate a corresponding control signal for detection and transmit the control signal for detection to the addressing circuit, where the address of the starting group of the detection units is determined based on a result of a calibration process. The emitting module is configured to receive the emitting control signal transmitted by the control module, and then a corresponding group of emitting units is activated to emit a detection beam. The addressing circuit is configured to perform a decoding process and a logic operation process regarding the control signal for detection, determine the address of the corresponding starting group of detection units that has been processed by the calibration process, and determine addresses of other groups of detection units to be synchronously activated at the same time with the starting group of the detection units, determine a channel selecting address, and generate a selecting and controlling signal for corresponding channels. The receiving module is configured to receive the channel selecting and controlling signal transmit by the addressing circuit, and a corresponding group of detection units is activated to perform photoelectric signal conversion of an echo beam.

Optionally, the control module is configured to trigger the calibration process between the emitting module and the receiving module when a predetermined condition for calibration is met.

By using the control solution of a lidar in this disclosure, firstly, a corresponding control signal for detection is generated by acquiring the address of the starting group of the detection units that is paired with the group of the emitting units activated in the lidar. Then, the address of the starting group of the detection units that is correspondingly performed a calibration process is determined by performing a decoding process and a logic operation process regarding the control signal for detection. Finally, addresses of other groups of detection units to be synchronously activated at the same time with the starting group of the detection units are determined, determine a channel selecting address, and generate a corresponding channel selecting and controlling signal, and the corresponding group of the detection units is activated to perform photoelectric signal conversion on the echo beam based on the channel selecting and controlling signal. It may be learnt from the foregoing solution that the group of the detection units of the receiving module is activated according to the address of the starting group of the detection units determined by the result of the calibration process and an activation state of each group of detection units may be flexibly controlled according to the result of the calibration process to implement the dynamic adjustment of a photoelectric detection region, so that the receiving module may detect the echo beam in a photoelectric detection region with the optimal light alignment effect, reducing the case of the loss of an optical signal, and improving the operating stability of the lidar. Therefore, the accuracy of echo detection performed by the lidar may be improved, and the integrity of data for echo detection may be effectively ensured.

Beneficial Effects

By using the solution of the addressing circuit of a lidar in this disclosure, after receiving the control signal for detection, a decoding process and a logic operation process may be performed on the control signal for detection, so as to obtain a channel selecting address that is paired with the control signal for detection, and output a selecting and controlling signal for corresponding channels to the receiving module of the lidar. From the foregoing solution, it may be learnt that the decoding module may convert a quantity of bits of the acquired control signal for detection into the decoding signal of more quantity of bits, thereby improving the accuracy of channel selecting and controlling of the lidar, and the combination logic module may perform a logic operation process on the decoding signal, so as to flexibly control an activation state of each group of detection units.

Therefore, the addressing circuit may dynamically adjust the photoelectric detection region activated of the receiving module according to actual conditions, so as to effectively ensure the accuracy and data volume of a detection result of the lidar.

BRIEF DESCRIPTION OF THE DRAWINGS

To describe the technical solutions in the embodiments of this disclosure more clearly, the following briefly introduces the accompanying drawings required for describing the embodiments of this disclosure or the related art. Apparently, the accompanying drawings in the following description show merely some embodiments of this disclosure, and a person of ordinary skill in the art may still derive other drawings from these accompanying drawings without creative efforts.

FIG. 1c is a schematic diagram of mismatch between the transmitting field of view and receiving field of view in an application scenario of this disclosure.

FIG. 1d is a schematic diagram of comparison of match between the transmitting field of view and receiving field of view and mismatch between which in an application scenario of this disclosure.

FIG. 2 is a flowchart of a control method of a lidar according to an embodiment of this disclosure.

FIG. 3 is a flowchart of a calibration process method of a lidar according to an embodiment of this disclosure.

DETAILED DESCRIPTION

As described in the related art, although when lidar hardware is assembled, a channel selecting and controlling solution between an emitting module and a receiving module may be determined by a light alignment operation, due to machining errors and interference in actual operation, a field of view between the emitting module and the receiving module is not matched. As a result, a spot formed on a detection unit array after the receiving module converges an echo beam has a position deviation from an activated photoelectric detection region. That is, the photoelectric detection region activated of the receiving module fails to be aligned with the echo beam.

In the foregoing case, there is no optical signal in a part of regions of the photoelectric detection region or a corresponding optical signal strength is relatively weak, and photoelectric signal conversion cannot be performed. However, there is an optical signal suitable for performing detection outside the activated photoelectric detection region, resulting in the loss of an optical signal of the echo beam. If the position deviation between the spot and the activated photoelectric detection region is relatively large, it will cause serious loss of the optical signal.

To enable a person skilled in the art to better understand the foregoing technical problem, exemplary introduction is performed below with reference to the accompanying drawings and specific application scenarios.

In an application scenario, a lidar may include an emitting module and a receiving module. The emitting module may include an emitting unit array, and the receiving module may include a detection unit array. When the lidar is assembled, an optimal channel selecting and controlling solution between a group of emitting units and a group of detection units may be determined by a light alignment operation. When the lidar is in operation, according to an optimal address selection correspondence obtained by the light alignment operation, the group of the emitting units and the group of the detection units of a corresponding address may be activated to implement channel selecting and controlling for transmitting or receiving.

Figure 1A:
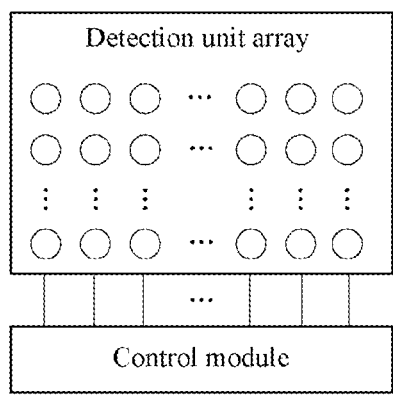
FIG. 1a is a schematic diagram of connection between a detection unit array and a control module in an application scenario of this disclosure.

If in the application scenario, a column of emitting units of the emitting unit array corresponds to three consecutive columns of detection units in the detection unit array, as shown in FIG. 1a, detection units located in the same column may be used as a group of detection units. An enabling port of each group of detection units is respectively connected with a control module of the lidar, so that the control module may respectively control activation or deactivation of each group of detection units.

In other application scenarios, other forms of combinations of detection units may be used as the group of the detection units. For example, detection units located in the same row are used as a group of detection units, or the detection unit array is divided into a plurality of rectangular arrays of E rows×F columns, and a plurality of detection units in each rectangular array are used as a group of detection units, where e represents a positive integer not greater than the total quantity of rows of the detection unit array, and f represents a positive integer not greater than the total quantity of columns of the detection unit array.

For example, in the application scenario shown in FIG. 1a, each detection unit includes several single photon avalanche diode (SPAD) arrays, and a plurality of detection units are arranged in a line row and may be used as a group of detection units. If a level signal outputted by the control module to an enabling port may control a bias voltage of a corresponding group of detection units to be greater than a breakdown voltage, the corresponding group of detection units is activated, and each detection unit in the activated group of detection units is in an active state. If a level signal outputted by the control module to an enabling port may control a bias voltage of a corresponding group of detection units to be less than a breakdown voltage, the corresponding group of detection units is deactivated, and each detection unit in the deactivated group of detection units is in a deactivate state.

As another implementation, the control module is caused to output a level signal to an enabling port to control a readout circuit of the corresponding group of detection units to be connected to output a detection signal, and then the corresponding group of detection units is activated. The control module outputs another level signal to the enabling port to control the readout circuit of the corresponding group of detection units to be disconnected to cut off an output path of the detection signal, and the corresponding group of detection units is deactivated.

Figure 1B:
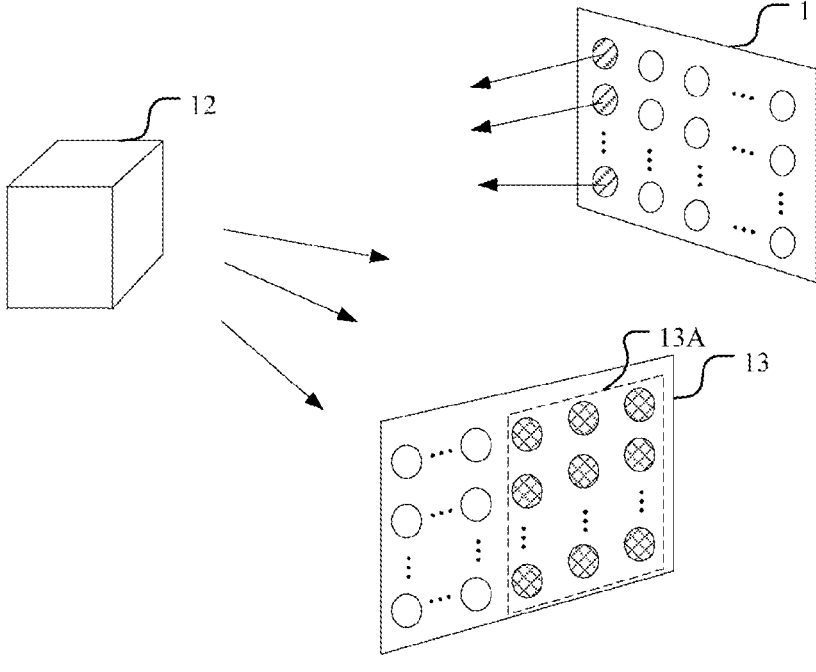
FIG. 1b is a schematic diagram of match between the transmitting field of view and receiving field of view in an application scenario of this disclosure.

In a case that a field of view between the emitting module and the receiving module is matched, as shown in FIG. 1b, a column of emitting units (referring to a column of emitting units filled with oblique lines shown in FIG. 1b) in an emitting unit array 11 is activated to emit a laser beam, and an echo beam reflected by a target object 12 forms a spot 13A on a detection unit array 13.

Three consecutive columns of detection units (referring to the three columns of detection units shown in the grid filling in FIG. 1b) are activated in the detection unit array 13 to form an activated photoelectric detection region (referring to the three columns of emitting units filled with grids shown in the in FIG. 1b), so as to perform photoelectric signal conversion of the echo beam to detect the electrical signal that is paired with the echo beam.

For ease of description, a column of emitting units filled with oblique lines may be used as a first column of emitting units of the emitting unit array 11, and sorting is performed in order of a distance from the first column of emitting units from near to far. A column of the three columns of detection units filled with grids that is closest to an edge of the detection unit array 13 is used as the first column of detection units, and sorting is performed in order of a distance from the first column of detection units from near to far. Therefore, in FIG. 1b, the first column of emitting units of the emitting unit array 11 corresponds to the first column of detection units to the third column of detection units of the detection unit array 13. When the first column of emitting units of the emitting unit array 11 is activated, the first column of detection units to the third column of detection units of the detection unit array 13 are also correspondingly activated.

In a case that a field of view is matched, a region in which the spot 13A is located may be regarded as an ideal position of the spot. Because the spot 13A overlaps with the activated photoelectric detection region, the activated three columns of detection units may detect enough echo optical signals. However, in actual applications, due to factors such as production process deviation and interference on modules, there may be the misalignment between fields of view of the emitting module and the receiving module. As a result, a field of view between the emitting module and the receiving module is not matched.

As shown in FIG. 1c, due to production errors or interference in actual operation, a field of view between the emitting module and the receiving module is matched. The first column of emitting units (referring to a column of emitting units filled with oblique lines shown in FIG. 1c) in an emitting unit array is activated to emit a laser beam, and an echo beam reflected by a target object 12 forms a spot 13A' on a detection unit array. Compared with the spot 13A in FIG. 1b, due to the misalignment between fields of view of the emitting module and the receiving module, the spot 13A' deviates by one column of detection units from the first column of detection units to the second column of detection units in the image shown in FIG. 1c. If the first column of detection units to the third column of detection units in the detection unit array are activated according to an originally set address selection correspondence, a part of the detection units in the formed photoelectric detection region do not coincide with a position of spot 13A'. That is, the first column of detection units cannot detect the optical signal, and the spot 13A' partially falls into the detection unit that is not activated, and there is no output of a corresponding detection signal, resulting in the loss of an optical signal of the echo beam.

Based on the foregoing description, because the transmitting or receiving field of view is not matched, an actual position of the spot is deviated by a column of detection units relative to the ideal position, after a laser beam emitted by each column of emitting units is reflected by the target object, there are deviations at all positions of the spot formed on the detection unit array. Among the activated three consecutive columns of detection units, there is one column of detection units that cannot detect the optical signal, and only two columns of detection units may detect the optical signal. Therefore, there is a problem of the loss of the optical signal.

For ease of understanding, reference may be made to a comparison diagram of the field of view between the emitting module and the receiving module being matched and the field of view between the emitting module and the receiving module being not matched shown in FIG. 1d. The ideal position of the spot that is paired with the first column of emitting units coincides with a region in which the first column of detection units to the third column of detection units are located in the detection unit array. However, the actual position of the spot that is paired with the first column of emitting units is deviated by a column of detection units from the detection unit array, and coincides with a region in which the second column of detection units to the fourth column of detection units are located in the detection unit array. In this case, only the second column of detection units and the third column of detection units in the first column of detection units to the third column of column of detection units that are gated may detect the optical signal. By analogy, the spot that is paired with each column of emitting units such as the second column of emitting units and the third column of emitting units in the emitting unit array also deviates by a column of detection units, and the first column of detection units, the fourth column of detection units, or the seventh column of detection units cannot detect the optical signal when activated.

To resolve the foregoing problem of the loss of an optical signal, the misalignment between fields of view of the emitting module and the receiving module may be reduced by improving the machining precision in the production stage. However, in an actual light alignment process, the requirement for the light alignment accuracy between the actual position and the ideal position of the detection unit is very strict. For example, an error of the light alignment accuracy needs to be controlled below 10 μm. However, in the actual production stage, the machining precision error usually reaches about 30 μm, and it is difficult to implement the requirement for controlling an error of the light alignment accuracy below 10 μm. In addition, the interference caused by the lidar in actual operation cannot be compensated by improving the machining precision in the production stage, and therefore, there may further be a case that the field of view between the emitting module and the receiving module is not matched during operating.

In summary, how to resolve the problem the loss of an optical signal detected by a receiving module becomes an urgent problem for a person skilled in the art.

In view of the foregoing problems, a control solution of a lidar is provided in this embodiment of this disclosure. The address of the starting group of the detection units is determined by a result that has been processed by a calibration process that is paired with the activated group of emitting units to generate the corresponding control signal for detection, the channel selecting address of the group of the detection units that needs to be synchronously activated is obtained by performing a decoding process and a logic operation process on the control signal for detection, and the corresponding channel selecting and controlling signal is generated to activate the corresponding group of detection units to perform photoelectric signal conversion of the echo beam, thereby improving accuracy of echo detection performed by the lidar, and effectively ensuring the integrity of data for echo detection.

To enable a person skilled in the art to more clearly understand and implement an idea, an implementation solution, and advantages of this embodiment of this disclosure, a detailed description is made below with reference to the accompanying drawings through specific application scenarios.

Referring to a flowchart of this embodiment of a control method of a lidar in an embodiment of this disclosure shown in FIG. 2, in this embodiment of this disclosure, the control method may include: A1) acquiring an address of a starting group of detection units is paired with a group of activated emitters in the lidar, and generating a corresponding control signal for detection, where the address of the starting group of the detection units is determined based on a result of a calibration process;

A2) performing a decoding process and a logic operation process on the control signal for detection, determining the address of the corresponding starting group of the detection units that has been processed by the calibration process, and determining addresses of other groups of detection units to be synchronously activated at the same time with the starting group of the detection units, determine a channel selecting address, and generate a selecting and controlling signal for corresponding channels; and A3) activating, based on the channel selecting and controlling signal, a corresponding group of detection units to perform photoelectric signal conversion of an echo beam.

It may be learnt from the foregoing solution that the group of the detection units of the receiving module is activated according to the address of the starting group of the detection units determined by the result of the calibration process, and an activation state of each group of detection units may be flexibly controlled according to the result of the calibration process to implement the dynamic adjustment of a photoelectric detection region, so that the receiving module may detect the echo beam in a photoelectric detection region with the optimal light alignment effect, reducing the case of the loss of an optical signal, and improving the operating stability of the lidar. Therefore, the accuracy of echo detection performed by the lidar may be improved, and the integrity of data for echo detection may be effectively ensured.

In a specific embodiment, according to a predetermined emitting cycle and emitting sequence, the control module of the lidar may determine the address of the group of the emitting units that currently needs to be activated, so as to generate an emitting control signal to control an activation state of each group of emitting units. In response to the emitting control signal, the emitting module of the lidar activates the group of the emitting units that is paired with the emitting control signal of the emitting module to emit a detection beam, and the rest is not activated by the group of the emitting units that is paired with the emitting control signal, that is, the detection beam is not emitted.

Correspondingly, based on a calibrated address selection correspondence between the emitting unit and the detection unit, it may be determined that the group of the emitting units activated by the emitting control signal corresponds to the address of the starting group of the detection units whose field of view is best matched to generate the control signal for detection to control the activation state of each group of emitting units. After performing a decoding process and a logic operation process on the control signal for detection, the channel selecting and controlling signal that is paired with the control signal for detection is obtained, and the group of the emitting units that is paired with the control signal for detection of the emitting module is activated to perform photoelectric signal conversion of the echo beam. In addition, the rest is not deactivated by the group of the detection units that is paired with the control signal for detection, that is, photoelectric signal conversion is not performed.

The address of the starting group of the detection units obtained after performing a calibration process may be set in the predetermined address configuration parameters to facilitate invoking the control module. To facilitate the understanding and implementation of a person skilled in the art, a calibration process is described in detail below.

In a specific embodiment, as shown in FIG. 3, the calibration process may include the following method steps during execution: B1) activating the group of the emitting units and the group of the detection units respectively that are paired during the calibration process; B2) acquiring an electrical signal obtained by performing photoelectric signal conversion of the echo beam by the group of the detection units activated in step B1), and calculating an electrical signal strength that is paired with the activated group of detection units; and B3) acquiring an address that is paired with a group of detection units whose electrical signal strength meets a predetermined threshold for signal strength to obtain the address of the starting group of the detection units that is paired with the activated group of emitting units.

In a calibration process of this embodiment of this disclosure, by activating a group of emitting units and a group of detection units that are paired during the calibration process, and calculating a strength of the electrical signal obtained by conversion of the currently activated group of detection units, the actual distribution of the echo beam in the activated photoelectric detection region may be determined. Then, the group of the detection units that meets the threshold for signal strength is determined from the currently activated group of detection units, position information of the optimal starting group of detection units actually that is paired with the currently activated group of emitting units in the lidar is determined, and then, the photoelectric detection region with the optimal light alignment effect in the actual application may be determined. By acquiring the corresponding address as the address of the starting group of detection units that is paired with the currently activated group of emitting units, a position deviation between the photoelectric detection region and the echo beam may be corrected, and the dynamic adjustment of the photoelectric detection region may be implemented, so that the receiving module may detect the echo beam in the photoelectric detection region with the optimal light alignment effect, reducing the case of the loss of an optical signal, and improving the operating stability of the lidar. Consequently, the utilization of the echo signal of the lidar may be improved, and the detection accuracy may be improved.

In a specific embodiment, when the pairing relationship is used for representing to perform a calibration process, the address of the group of the emitting units and the address of the group of the detection units that are activated are needed. When correction is performed on the lidar, the group of the emitting units and the corresponding group of detection units may be respectively activated according to the pairing relationship.

The pairing relationship may represent a one-to-many relationship between the group of the emitting units and the group of the detection units, or a many-to-many relationship between the group of the emitting units and the group of the detection units. A specific representation manner of the pairing relationship is not limited in this embodiment of this disclosure. To facilitate the understanding and implementation of a person skilled in the art, a description is made below by several examples.

For example, if there is a pairing relationship between a group of emitting units 1 and groups of detection units 1 to 4, then when the group of the emitting units 1 is activated, the group of the detection units 1 to 4 are correspondingly activated.

In another example, if there is a pairing relationship between groups of emitting unit 1 to 2 and groups of detection units 1 to 2, then when the group of the emitting units 1 is activated, the group of the detection units 1 to 2 are correspondingly activated; when the group of the emitting units 2 is activated, the group of the detection units 1 to 2 are correspondingly activated; and when the groups of emitting units 1 to 2 are activated, the group of the detection units 1 to 2 are correspondingly activated.

In a specific embodiment, based on different correction requirements, the quantity of groups of detection units that have a pairing relationship with the group of the emitting units may be set.

For example, to be capable of accurately correcting the position deviation between the photoelectric detection region and the echo beam, a pairing relationship between one group of emitting units and all groups of detection units may be set. Therefore, when activating one group of emitting units, all groups of detection units are correspondingly activated, thereby reducing the complexity of setting the pairing relationship, and activating all groups of detection units to detect photoelectric signal of the echo beam. In this way, it may ensure the accurate address of the starting group of the detection units is obtained.

In another example, to be capable of quickly correcting the position deviation between the photoelectric detection region and the echo beam, a pairing relationship between one group of emitting units and a part of groups of detection units may be set. Therefore, when one group of emitting units is activated, a part of groups of detection units are correspondingly activated, thereby improving the efficiency of acquiring the address of the starting group of the detection units.

In a specific embodiment, transmitting or receiving address selection configuration parameters are set in the lidar for representing a group of emitting units and a group of detection units that have an address selection correspondence. In other words, the transmitting or receiving address selection configuration parameters may include address selection correspondence information between the group of the emitting units and the group of the detection units. When the lidar is in operation, the group of the emitting units and the corresponding group of detection units may be respectively activated according to the transmitting or receiving address selection configuration parameters. To ensure the reliability of the pairing relationship, the pairing relationship information may be set based on the address selection correspondence information included in the transmitting or receiving address selection configuration parameters.

Optionally, the group of the detection units that has a pairing relationship with the group of the emitting units may at least include: a group of detection units that has an address selection correspondence with the group of the emitting units. For example, the group of the detection units that has an address selection correspondence with the group of the emitting units 1 is: the group of the detection units 1 to 3, and then, the group of the detection units that has a pairing relationship with the group of the emitting units 1 may include: groups of detection units 1 to F, where F≥3.

In a specific embodiment, a strength of each signal may be calculated by the formula of 201 g (U), where U represents an electrical signal obtained by performing photoelectric conversion.

In a specific embodiment, a threshold for signal strength may be any one of the following: 1) acquiring the group of the detection units with the strongest electrical signal strength; and 2) acquiring a group of detection units whose electrical signal strength exceeds a predetermined strength threshold.

In a specific embodiment, there may be a plurality of groups of detection units whose electrical signal strength meets the threshold for signal strength, and it cannot be determined which address of the group of the detection units should be used. If the addresses of all groups of detection units that meet the threshold for signal strength are used, it will cause oversaturation of the data volume and waste of hardware resources. To resolve the foregoing problems, the step B3) may include step B31) and step B32).

B31) Based on a predetermined sequence for reading signals, whether the electrical signal strength that is paired with the activated group of detection units meets the threshold for signal strength is sequentially determined.

In a specific embodiment, the sequence for reading signals may be set according to a hardware connection manner at an output port of the group of the detection units.

In an optional example, the output port of the group of the detection units may perform signal outputting in a manner of serial connection, such as signal readout circuit connection between the output port of the detection unit and a multiplexed structure, and signals of the group of the detection units are sequentially outputted. In this case, a channel selecting sequence of the signal readout circuit may be set to a sequence for reading signals.

In another optional example, the output port of the group of the detection units may perform signal outputting in a manner of parallel connection. In this case, the sequence for reading signals may be set according to a number that is paired with the output port of the group of the detection units, such as performing signal reading in ascending order of the number, or performing signal reading in descending order of the input port.

B32) determining an address that is paired with a group of detection units through which converted first electrical signal strength meets the threshold for signal strength to obtain the address of the starting group of the detection units that is paired with the activated group of emitting units.

In a specific embodiment, the lidar is configured to trigger correction performed on the emitting module and the receiving module when a predetermined condition for calibration is met.

Specifically, the control module of the lidar may generate a field of view calibration instruction when the predetermined condition for calibration is met, to trigger a calibration process. Any one of the following manners may be used to determine whether the condition for calibration is met: 1) determining whether the lidar is assembled, and if yes, the condition for calibration is met; and 2) based on the electrical signal detected by the activated group of detection units, determining whether there is a detection unit that exceeds a predetermined quantity threshold that fails to perform photoelectric conversion, and if yes, the condition for calibration is met. The predetermined quantity threshold may be set according to specific scenarios.

Further, the lidar may be put into an assembling state through a manual operation. In addition, in response to a predetermined calibration cycle or a manual operation, the condition for calibration may be determined.

In a specific embodiment, after the address of the starting group of the detection units that is paired with the currently activated group of emitting units is obtained through a calibration process, the group of the detection units that is paired with the address of the starting group of the detection units may be used as the activated starting group of the detection units that is paired with the currently activated group of emitting units. That is, the starting group of the detection units of the currently activated group of emitting units is adjusted, and according to the address of the starting group of the detection units, the other groups of detection units to be synchronously activated at the same time with the starting group of the detection units are determined, so as to perform dynamic adjustment on the photoelectric detection region.

Therefore, when the group of the emitting units is activated, the address of the adjusted starting group of the detection units (that is, the address of the starting group of the detection units determined by the result of the calibration process) and the addresses of the other groups of detection units to be synchronously activated are acquired. The activated group of detection units forms the photoelectric detection region with the optimal light alignment effect, thereby ensuring the accuracy of echo detection, and effectively ensuring the integrity of data for echo detection.

In a specific embodiment, the transmitting or receiving address selection configuration parameters may be adjusted based on the address of the starting group of the detection units determined by the result of the calibration process, so that the adjusted transmitting or receiving address selection configuration parameters include an address selection correspondence between the starting group of the detection units determined by the result of the calibration process and the currently activated group of emitting units.

Specifically, a method of adjusting the transmitting or receiving address selection configuration parameters may include: C1) acquiring the transmitting or receiving address selection configuration parameters, and determining the address of the starting group of the detection units that has an address selection correspondence with the currently activated group of emitting units to obtain the address of the starting group of the detection units before calibration; C2) matching the address of the starting group of the detection units determined by the result of the calibration process with the address of the starting group of the detection units before calibration, and if the two do not match, determining an address deviation between the two; and C3) based on the address deviation, adjusting the transmitting or receiving address selection configuration parameters, to cause the starting group of the detection units determined by the result of the calibration process to establish an address selection correspondence with the currently activated group of emitting units.

The foregoing solution is used, and by matching the address of the starting detection unit before calibration with the address of the starting detection unit after calibration, it may be determined whether there is a deviation between an actual optimal detection position and an ideal optimal detection position. If it is determined that the two do not match, through the address deviation between the two, the transmitting or receiving address selection configuration parameters are adjusted, and an address selection correspondence between the group of the detection units determined after calibration and the currently activated group of emitting units is established, so as to correct a channel selecting and controlling solution between the group of the emitting units and the group of the detection units through the address deviation, dynamically adjust the photoelectric detection region actually activated of the receiving module, and compensate the position deviation between the activated photoelectric detection region and the echo beam. In actual applications of the control module, the lidar may include the control module. The control module is configured to output an emitting control signal to the emitting module according to the transmitting or receiving address selection configuration parameters to control the activation or deactivation of each group of emitting units, determine that the group of the emitting units activated by the emitting control signal corresponds to the group of the detection units that needs to be activated according to an address selection correspondence between the emitting unit and the detection unit, and output a control signal for detection to the receiving module to control the activation or deactivation of each group of detection units.

The control module performs a calibration process between a group of emitting units and a group of detection units that are paired during the calibration process. After acquiring the address of the starting group of the detection units that is paired with the currently activated group of emitting units through a calibration process, the control module may use the group of the detection units that is paired with the address of the starting group of the detection units as the activated starting group of the detection units that is paired with the currently activated group of emitting units, that is, adjust the starting group of the detection units of the currently activated group of emitting units, and according to activation timing of each group of emitting units, determine the other groups of detection units to be synchronously activated at the same time with the starting group of the detection units, so as to perform dynamic adjustment on the photoelectric detection region.

As another implementation, in actual applications, the address selection correspondence between the group of the emitting units and the group of the detection units may be set in the lidar, and the address selection correspondence may be updated based on the result of the calibration process to flexibly control the activation state of each group of detection units according to the result of the calibration process. For each activated group of emitting units, it may be determined to perform echo signal detection on one or more activated groups of detection units with the optimal light alignment effect that is paired with the activated group of emitting units according to the updated address selection correspondence.

It may be understood that in actual applications, the control module of the lidar may include a correction unit.

That is, the control module implements the calibration function by performing the calibration process; or the control module may establish communication connection with the correction module. That is, the control module performs the calibration process steps by triggering the correction module to implement the calibration function. An entity that performs the step of correction processing in actual applications is not specifically limited in this embodiment of this disclosure.

In addition, when the control module includes a correction unit, the control module is implemented by using a processor. When the control module establishes communication connection with the correction module, the control module and the correction module may be respectively implemented by different processor cores of a processor, or the control module and the correction module may be respectively implemented by different processors.

The processor may be processing chips such as a central processing unit (CPU), a graphics processing unit (GPU), and a field programmable gate array (FPGA), an application specific integrated circuit (ASIC), or one or more integrated circuits configured to implement this embodiment of this disclosure.

In a specific embodiment, the lidar includes a time-digital conversion unit. Through the time-digital conversion unit, the electrical signal of the corresponding group of the detection units may be collected, and a signal strength determining unit acquires the electrical signal collected by the time-digital conversion unit and calculates the corresponding strength. Optionally, a strength of each signal is calculated by the formula of 201 g (U), where U represents the electrical signal collected by the time-digital conversion unit.

The electrical signal collected by the time-digital conversion unit may be stored according to the hardware structure of the lidar to be invoked by the signal strength determining unit of the correction module. For example, the electrical signal collected by the time-digital conversion unit may be stored in a memory of the lidar, and may also be stored in a storage region that is correspondingly set in the correction module. A storage manner of the electrical signal collected by the time-digital conversion unit is not specifically limited in this embodiment of this disclosure.

In the related art, the lidar may include a decoding module. The decoding module may receive a control signal for detection, perform addressing on the control signal for detection, determine a channel selecting address that is paired with the control signal for detection, and output a selecting and controlling signal for corresponding channels to the receiving module.

The control signal for detection may be generated by the control module based on the configuration parameters, and may also be generated by other devices based on the corresponding configuration parameters. A source of the control signal for detection is not specifically limited in this disclosure.

The decoding module is usually implemented by a decoder, receives a control signal for detection to perform decoding, outputs a selecting and controlling signal for corresponding channels, and activates a group of detection units of a corresponding path. However, it may be learnt from decoding characteristics of the decoder that the decoder may only control a bias voltage of one group of detection units to be greater than a breakdown voltage. That is, the decoder may only activate one group of detection units at a time, and the limitation is relatively large.

To be capable of synchronously activating a plurality of groups of detection units, changes need to be made to a hardware connection manner of the group of the detection units. For example, referring to FIG. 4, a column of detection units may be regarded as a group of detection units. Enabling ports of three consecutive columns of detection units are connected in parallel and share an output port of a decoding module (that is, the three groups of detection units share an enabling signal), and the corresponding three consecutive columns of detection units may be controlled to synchronously activate or synchronously deactivate by changing a level signal inputted by the enabling port connected in parallel.

However, the hardware connection manner has been fixed during production and cannot be flexibly changed according to actual conditions. Therefore, the decoder still has a limitation in an operating process of the lidar. Specifically, referring to FIG. 1b to FIG. 1d, FIG. 4, and related descriptions, when performing a calibration process, because the hardware connection manner is fixed, and cannot be changed, the detection units spaced in two columns may only be selected in a deviation direction of the spot. For example, the starting group of the detection units that is paired with the first column of emitting units is adjusted from the first column of emitting units to the fourth column of detection units, and the address selection correspondence cannot be adjusted to: the first column of emitting units that is paired with the second column of detection units.

To resolve the problem of the limitation of the decoder, this disclosure provides an addressing solution of a lidar. After receiving the control signal for detection, a decoding process and a logic operation process may be performed on the control signal for detection. The activation state of each group of detection units may be controlled by outputting a corresponding decoding logic level signal to the receiving module.

To enable a person skilled in the art to more clearly understand and implement an idea, an implementation solution, and advantages of this embodiment of this disclosure, a detailed description is made below with reference to the accompanying drawings through specific application scenarios.

Figure 5:
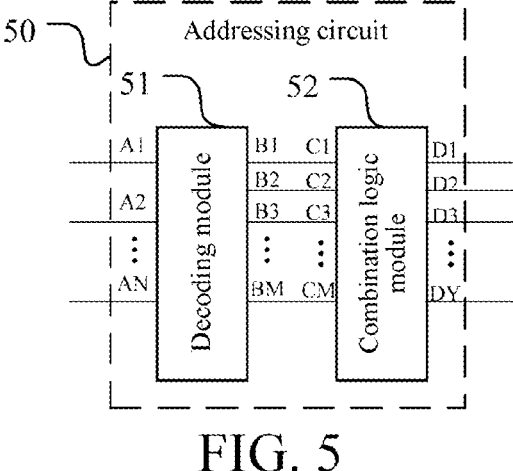
FIG. 5 is a schematic structural diagram of an addressing circuit according to an embodiment of this disclosure.

Referring to FIG. 5, the addressing circuit 50 may include a decoding module 51 configured to perform a decoding process and a combination logic module 52 configured to perform a logic operation process.

The decoding module 51 is configured to perform a decoding process on a received control signal for detection, determine an address of a starting group of detection units that has been processed by the calibration process that is paired with the control signal for detection, and transmit a corresponding decoding signal to the combination logic module 52, where the control signal for detection is generated based on the address of the starting group of the detection units that is paired with a group of activated emitters in the lidar, and the address of the starting group of the detection units is determined based on a result of a calibration process.

The combination logic module 52 is configured to perform a logic operation process on a received decoding signal, determine addresses of other groups of detection units to be synchronously activated at the same time with the starting group of the detection units, and form a channel selecting address with the address of the starting group of the detection units to output a selecting and controlling signal for corresponding channels to a receiving module of the lidar to control activation of a corresponding group of detection units in the receiving module.

In a specific embodiment, the decoding module 51 may include a plurality of input ports and a plurality of output ports. Referring to N input ports A1 to AN and M output ports B1 to BM shown in FIG. 5, N and M may be positive integers greater than 1, and M=2N.

According to the quantity N of input ports of the selected decoding module, a signal of N bits may be received. The decoding module 51 utilizes signals received in parallel by the input ports A1 to AN as the control signal for detection, performs a decoding process on the control signal for detection, determines the address of the starting group of the detection units that needs to be activated that is paired with the control signal for detection, and transmits the corresponding decoding signal to the combination logic module 52 through the output ports B1 to BM.

For example, if the decoding module 51 selects a 2/4 decoding module, the decoding module 51 may receive a signal of 2 bits as a control signal for detection, and the 2/4 decoding module outputs a decoding signal of 4 bits after performing a decoding process on the control signal for detection of 2 bits. If the decoding module 51 selects a 3/8 decoding module, the decoding module 51 may receive a signal of 3 bits as a control signal for detection, and the 3/8 decoding module outputs a decoding signal of 8 bits after performing a decoding process on the control signal for detection of 3 bits.

Specifically, after performing a decoding process on the control signal for detection, the decoding module may obtain a decoding path indicated by the control signal for detection to obtain the output port that is paired with the starting group of the detection units. The output port that is paired with the starting group of the detection units outputs the first decoding level signal, and the other output ports output the second decoding level signal.

The first decoding level signal is different from the second decoding level signal. According to a model of the decoding module 51, the first decoding level signal may be a high-level signal or a low-level signal. Correspondingly, the second decoding level signal may be a low-level signal or a high-level signal.

In a specific embodiment, the combination logic module 52 may include a plurality of input ports and a plurality of output ports. Referring to M input ports C1 to CM and Y output ports D1 to DY shown in FIG. 5.

Input ports of the combination logic module 52 are respectively connected with different output ports of the decoding module, and output ports of the combination logic module 52 are respectively connected with enabling ports of different groups of detection units. The combination logic module 52 receives the decoding signal (including the first decoding level signal and the second decoding level signal) outputted by the decoding module in parallel through the input ports C1 to CM, performs a logic operation process on the decoding signal outputted by the decoding module, determines the addresses of the other groups of detection units to be synchronously activated at the same time with the starting group of the detection units, forms the channel selecting address with the address of the starting group of the detection units, and outputs the channel selecting and controlling signal obtained by performing a logic operation process at the output ports D1 to DY.

Specifically, after performing a logic operation process, the combination logic module may obtain a channel selecting path indicated by the control signal for detection to obtain the output ports that are paired with the starting group of the detection units and other groups of detection units to be synchronously activated, that is, the output port that is paired with the group of the detection units that needs to be activated. The output port that is paired with the group of the detection units to be activated outputs the first channel selecting level signal, and the other output ports output the second channel selecting level signal.

The first channel selecting level signal is different from the second channel selecting level signal. The first channel selecting level signal is used for controlling the activation of the connected group of the detection units, and the second channel selecting level signal is used for controlling the deactivation of the connected group of the detection units. The quantity Y of output ports of the combination logic module 52 is not less than the quantity M of input ports of the combination logic module 52.

In a specific embodiment, according to an activation manner of the group of the detection units, the first channel selecting level signal may be a high-level signal or a low-level signal. Correspondingly, the second channel selecting level signal may be a low-level signal or a high-level signal.

Optionally, the quantity of input ports of the combination logic module 52 is not greater than the quantity of output ports of the decoding module 51, and the quantity of output ports of the combination logic module 52 is not less than the quantity of the group of the detection units.

Compared with the channel selecting and controlling solution in FIG. 1a, this embodiment of this disclosure may implement more channel selecting and controlling combinations by the control signal for detection of fewer digits.

Specifically, in FIG. 1a, one group of detection units corresponds to an enabling signal, and a control signal for detection of N bits controls N groups of detection units. By using the addressing circuit provided in this embodiment of this disclosure, the control signal for detection of N bits may control M groups of detection units. In addition, because there is a correspondence of M=2N between the output port and the input port of the decoding module, as N increases, the quantity of groups of detection units that may be controlled by the addressing circuit provided in this embodiment of this disclosure may implement exponential increase, which is much greater than the quantity of groups of detection units controlled by the channel selecting and controlling solution in FIG. 1a. In addition, when a plurality of groups of detection units need to be synchronously activated, the control module in FIG. 1a needs to acquire the corresponding address position information through a program. Through the addressing circuit shown in FIG. 5, only the address position information of the starting group of the detection units needs to be determined, and the address position information of all groups of detection units to be synchronously activated may be obtained through a combination logic process, and the addressing efficiency is higher.

Figure 4:
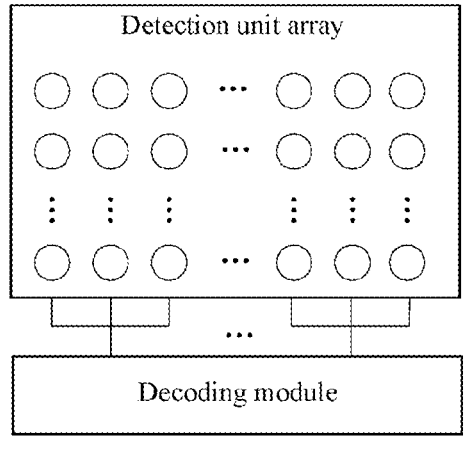
FIG. 4 is a schematic diagram of connection between a detection unit array and a decoding module according to an embodiment of this disclosure.

Compared with the channel selecting and controlling solution in FIG. 4, in this embodiment of this disclosure, finer channel selecting and controlling may be implemented by the control signal for detection.

Referring to FIG. 4 and related descriptions, when performing a calibration process on the lidar, due to limitations of hardware connection, only three consecutive columns of detection units may be selected in a deviation direction of the spot. For example, the address selection correspondence is adjusted to: the first column of emitting units that is paired with the fourth column of detection units to the sixth column of detection units, but the address selection correspondence cannot be adjusted to: the first column of emitting units that is paired with the second column of detection units to the fifth column of detection units. The addressing circuit provided in this embodiment of this disclosure is used. Because the group of the detection units is connected with one output port of the addressing circuit, and is not controlled by the enabling port connected in parallel, the addressing circuit may independently control the activation state of each group of detection units, so that according to the result of the calibration process, the address of the starting group of the detection units may be deviated by one or more bits to adjust the photoelectric detection region activated of the receiving module. In an operating process of the lidar, the optimal photoelectric detection region may be activated according to the starting group of the detection units after calibration.

In summary, by using the addressing circuit provided in this embodiment of this disclosure, the decoding module may convert a quantity of bits of the acquired control signal for detection into the decoding signal of more quantity of bits, thereby improving the channel selecting and controlling accuracy of the lidar, while the combination logic module may perform a logic operation process on the decoding signal, so as to flexibly control an activation state of each group of detection units. Therefore, the addressing circuit may dynamically adjust the photoelectric detection region activated of the receiving module according to actual conditions, so as to effectively ensure the accuracy and data volume of a detection result of the lidar.

In a specific embodiment, the combination logic module may include various types of gates. According to the logic type division, the gates may include: a WITH gate, an OR gate, and a NOT gate. According to the semiconductor process division, the gate may include: a metal-oxide-semiconductor field-effect-transistor (MOSFET) gate, a transistor-transistor logic (TTL) gate, an emitter coupling logic (ECL) gate, and a metal semiconductor field effect transistor (MESFET) gate.

Using the OR gate as an example that may be implemented, the combination logic module may include a plurality OR gates, and each OR gate respectively includes a plurality of input ports and an output port. An input port of each or gate may be used as the input port of the combination logic module and is connected with an output port of the decoding module at the corresponding position. According to a connection sequence of the output port of the decoding module, other different input ports of each OR gate are further respectively connected with first x−1 output ports of the decoding module at the corresponding position (that is, the other different input ports of each OR gate are further respectively connected with the first x−1 input ports as the input ports of the gates of the input ports of the combination logic module). As the output port of the combination logic module, the output port of each OR gate may be respectively connected with a group of detection units.

According to a connection sequence of the output port of the decoding module, at least the other output ports of the first OR gate are connected with the low-level signal, and x represents the quantity of groups of detection units to be synchronously activated.

According to FIG. 4 and related descriptions, in the channel selecting and controlling solution provided in FIG. 4, the channel selecting relationship between the group of the detection units is fixed.

For example, only the first column of detection units, the second column of detection units, and the third column of detection units may be synchronously activated, and the second column of detection units, the third column of detection units, and the fourth column of detection units cannot be synchronously activated. For the addressing circuit provided in this embodiment of this disclosure, the corresponding group of detection units may be gated according to the control signal for detection. For example, the first group of detection units to the xth group of detection units may be synchronously activated, and the second group of detection units to the x+1th group of detection units may be synchronously activated, so that various channel selecting and controlling combinations may be arranged and combined to perform fine channel selecting and controlling on the detection unit array.

By using the foregoing solution, an OR logic operation may be performed on the decoding signal outputted by the decoding module. According to a position of the output port that outputs the first decoding level signal in the output port of the decoding module, the channel selecting address of X groups of detection units to be synchronously activated may be determined, so that the corresponding X groups of detection units may be synchronously activated, the activation state of each group of detection units may be flexibly controlled, and the channel selecting and controlling may be implemented through gates of same logic type, which is conducive to hardware design and device procurement.

It may be understood that embodiments provided in this disclosure are only exemplary descriptions. In actual applications, the decoding module and the combination logic module may further include other input and output ports, for example, an enabling port configured to switch the operating state, or the like. Specific structures of the decoding module and the combination logic module are not limited in this disclosure.

In a specific embodiment, according to the actual requirement for the quantity of decoding ports, a model of a decoding module that meets the requirement may be selected. When the quantity of ports of the decoding module does not meet the requirement, the decoding module with a greater quantity of input and output ports may be replaced, and a plurality of decoding modules may also be combined to obtain more decoding paths and combine with the corresponding combination logic module to control a greater quantity of groups of detection units. To facilitate the understanding and implementation of a person skilled in the art, a detailed description is made below by specific implementations.

Figure 6:
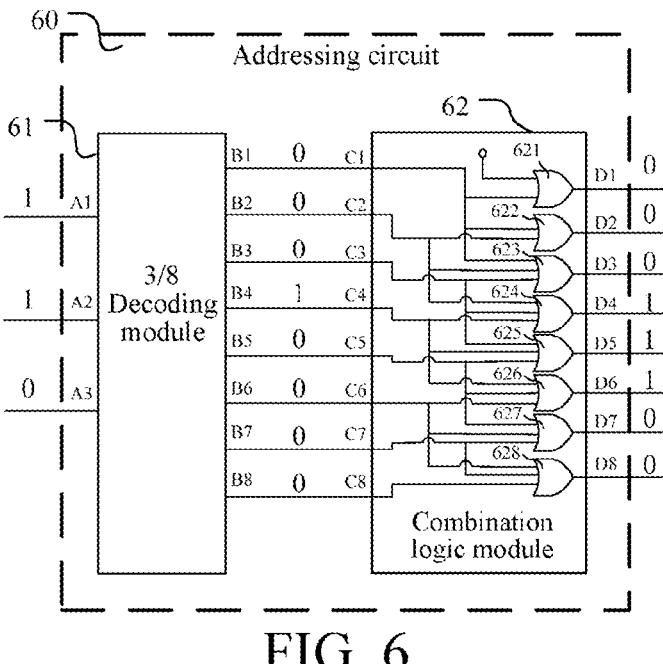
FIG. 6 is a schematic diagram of connection of an addressing circuit according to an embodiment of this disclosure.

In an embodiment of this disclosure, FIG. 6 is a schematic diagram of connection of an addressing circuit. The addressing circuit 60 may include a 3/8 decoding module 61 and a combination logic module 62, where the 3/8 decoding module 61 may include three input ports A1 to A3 and eight output ports B1 to B8, and the combination logic module 62 may include eight input ports C1 to C8 and eight output ports D1 to D8. The quantity of groups of detection units to be synchronously activated is three, and the addressing circuit 60 may control at most eight groups of detection units through three input ports.

If in this embodiment of this disclosure, both the input and output of the 3/8 decoding module 61 are high-level signals being effective, the first decoding level signal is a high-level signal, and the second decoding level signal is a low-level signal. For ease of description, a value "1" is used for representing the high-level signal, and a value "0" is used for representing the low-level signal.

Input ports A1 to A3 of the 3/8 decoding module 61 receive signals from the control module in parallel as the control signal for detection, and after performing a decoding process on the control signal for detection, may cause the output port that is paired with the control signal for detection to output the first decoding level signal "1", and cause the other output ports to output the second decoding level signal "0".

For example, as shown in FIG. 6, when the input ports A1 to A3 of the 3/8 decoding module 61 receive signals in parallel such as "1", "1", and "0" respectively, the 3/8 decoding module 61 performs a decoding process on the control signal for detection "110". A fourth output port B4 that is paired with the control signal for detection outputs the first decoding level signal "1", and the other output ports B1 to B3 and B5 to B8 output the second decoding level signal "0". In other words, the decoding level signal of 8 bits outputted by the 3/8 decoding module 61 in parallel is: "00010000".

The combination logic module 62 may include 8 OR gates 621 to 628. As the input port of the combination logic module 62, an input port of each OR gate is connected with the output port of the 3/8 decoding module 41 at the corresponding position. As the output port of the combination logic module 62, the output port of each OR gate is respectively connected with a group of detection units. According to a logic relationship implemented by the OR gate, the first channel selecting level signal outputted by the combination logic module 62 is a high-level signal "1", and the second channel selecting level signal outputted by the combination logic module 62 is a low-level signal "0".

For ease of description, according to the connection sequence of the output port of the 3/8 decoding module 61, each OR gate is sorted. For example, the OR gate 621 connected with the output port B1 of the 3/8 decoding module 61 is referred to as the first OR gate.

As shown in FIG. 6, the first OR gate 621 may include two input ports. As the input port C1 of the combination logic module 62, an input port of the first OR gate 621 is connected with the output port B1 of the 3/8 decoding module 61 at the corresponding position, and another input port of the first OR gate 621 is connected with a low-level signal.

The second OR gate 622 may include two input ports. As the input port C2 of the combination logic module 62, an input port of the second OR gate 622 is connected with the output port B2 of the 3/8 decoding module 61 at the corresponding position. Another input port of the second OR gate 622 is connected with the first 1 output port of the decoding module 61 at the corresponding position, that is, connected with the output port B1. Referring to FIG. 6, another input port of the second OR gate 622 may be connected with the input port that is used as the input port C1 of the first OR gate 621, thereby implementing connection with the output port B1.

A third OR gate 623 may include three input ports. As the input port C3 of the combination logic module 62, an input port of the third OR gate 623 is connected with the output port B3 of the 3/8 decoding module 61 at the corresponding position. The other two input ports of the third OR gate 623 are connected with the first 2 output ports of the decoding module 61 at the corresponding position, that is, connected with the output ports B1 and B2. Referring to FIG. 6, the other two input ports of the third OR gate 623 may be respectively connected with the input port that is used as the input port C1 of the first OR gate 621 and the input port that is used as the input port C2 of the second OR gate 622, thereby implementing connection with the output ports B1 and B2.

For a connection manner of the fourth OR gate 624 to the eighth OR gate 628, reference may be made to the description of the third OR gate 623, which is not repeated herein.

Still referring to FIG. 6, according to the logic relationship implemented by the OR gate, when the output port of the 3/8 decoding module 61 outputs the first decoding level signal "1", the output port of the combination logic module 62 at the corresponding position outputs the first channel selecting level signal. In addition, the last two output ports of the combination logic module 62 at the corresponding position also output the first channel selecting level signal, thereby controlling the activation of three groups of detection units.

For example, as shown in FIG. 6, when the output port B4 of the 3/8 decoding module 61 outputs the first decoding level signal "1", the output port of the fourth OR gate 624 (that is, the output port D4 of the combination logic module 62) outputs the first channel selecting level signal "1", the output port of the fifth OR gate 625 (that is, the output port D5 of the combination logic module 62) outputs the first channel selecting level signal "1", the output port of the sixth OR gate 626 (that is, the output port D6 of the combination logic module 62) outputs the first channel selecting level signal "1", and the output ports of the OR gates 621 to 623, the OR gate 627, and the OR gate 628 (that is, the output ports D1 to D3 of the combination logic module 62 and the output port D7 to the output port D8) output the second channel selecting level signal "0".

It may be understood that the foregoing embodiments are only exemplary descriptions. In actual applications, other gates may be combined according to specific requirements to obtain the corresponding combination logic module to implement channel selecting and controlling on the detection unit array. A type and a combination manner of gates are not specifically limited in this embodiment of this disclosure.

It may be learnt from the foregoing embodiments that the quantity of input ports of the selected OR gate may not be exactly the same, and the corresponding hardware circuits are also different. To improve the efficiency of hardware design, the gate may use the same hardware circuit design.

In a specific embodiment, one or more input ports of the plurality of OR gates that are not connected with the output port of the decoding module are all connected at a voltage of a low level. Specifically, for an OR gate with m input ports (m≥2), if the quantity of ports connected with the decoding module is less than m, the other input ports are all connected at a voltage of a low level. The OR gate corresponds to at least two input ports. Then, when there is only one input port between the OR gate and the decoding module, the quantity of input ports of the OR gate may be supplemented with at least one input port connected with the low level, so that the quantity of input ports of the OR gate ≥2.

Figure 7:
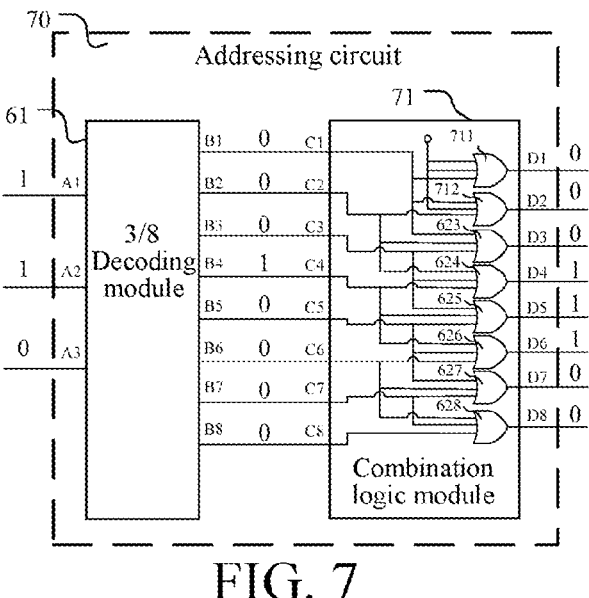
FIG. 7 is a schematic diagram of connection of another addressing circuit according to an embodiment of this disclosure.

Referring to the first OR gate 711 shown in FIG. 7, the first OR gate 711 includes three input ports, where an input port is used as the input port C1 of the combination logic module 71, and is connected with the output port B1 of the 3/8 decoding module 61 at the corresponding position, and the other two input ports of the first OR gate 711 are connected with the low-level signal.

Referring to the second OR gate 712 shown in FIG. 7, the second OR gate 712 includes three input ports, where an input port is used as the input port C2 of the combination logic module 71, and is connected with the output port B2 of the 3/8 decoding module 61 at the corresponding position. Another input port of the second OR gate 712 is connected with the input port that is used as the input port C1 of the first OR gate 711, thereby implementing connection with the output port B1. One remaining input port of the second OR gate 712 is connected with a low-level signal.

In a specific embodiment, more decoding paths may be obtained by using a plurality of decoding modules in combination. To reduce the usage ratio of the decoding module on the output port of the control module, and release the port of the control module for other control, the decoding module may be multiplexed with the output port of the same control module, and the decoding module configured to perform a decoding process may be selected by controlling the enabling port of each decoding module.

Figures 8, 9:
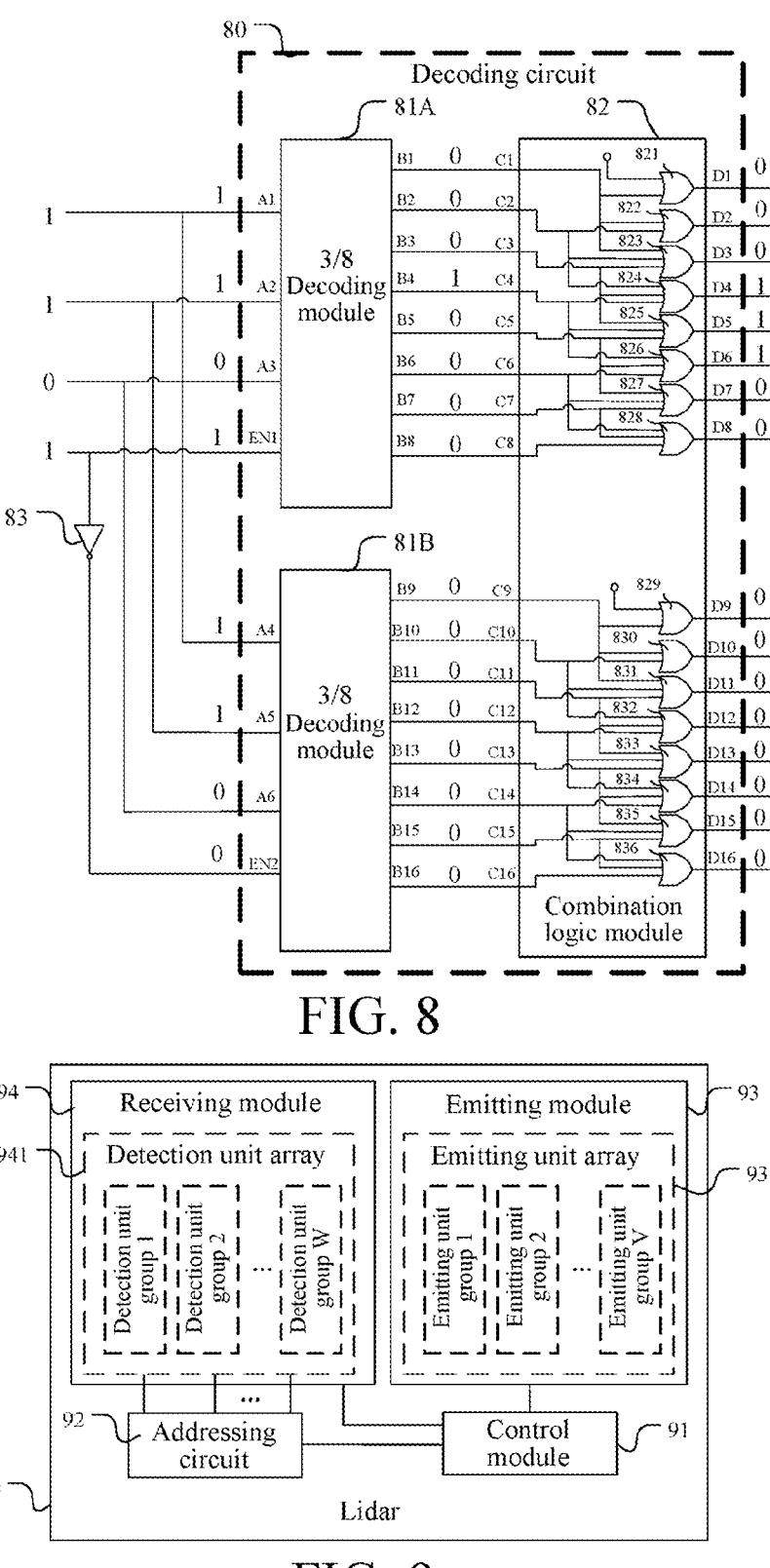
FIG. 8 is a schematic diagram of connection of another addressing circuit according to an embodiment of this disclosure.
FIG. 9 is a schematic structural diagram of a lidar according to an embodiment of this disclosure.

FIG. 8 is a schematic diagram of connection of another addressing circuit. In FIG. 8, the addressing circuit 80 may include a 3/8 decoding module 81A, a 3/8 decoding module 81B, and a combination logic module 82.

The 3/8 decoding module 81A may include three input ports A1 to A3, one enabling port EN1, and eight output ports B1 to B8, and the 3/8 decoding module 81B may include three input ports A4 to A6, one enabling port EN2, and eight output ports B9 to B16. The input port of the 3/8 decoding module 81A is correspondingly connected with the input port of the 3/8 decoding module 81B, and both receive the same control signal for detection, the enabling port EN1 of the 3/8 decoding module 81A is respectively connected with an output port of the control module, and is further connected with an input port of a NOT gate 83, and the output port of the NOT gate 83 is connected with the enabling port EN2 of the 3/8 decoding module 81B. The combination logic module 82 may include sixteen OR gates 821 to 836 to obtain sixteen input ports C1 to C16 and sixteen output ports D1 to D16. The quantity of groups of detection units to be synchronously activated is three.

Because the enabling port between the 3/8 decoding module 81A and the 3/8 decoding module 81B is connected by a NOT gate, one of the 3/8 decoding module 81A and the 3/8 decoding module 81B is selected to be triggered to operate. A decoding process is performed on the control signal for detection, and for a specific signal flow of the decoding circuit 80, reference may be made to FIG. 6, FIG. 7, and related descriptions of the specific signal flow of the decoding circuit 80, which is not repeated herein. The addressing circuit 80 may control at most sixteen groups of detection units through four input ports.

In a specific embodiment, a spot formed by the echo beam on the detection unit array may be greater than an effective detection range of the detection unit array. In a case that a field of view the emitting module and the receiving module is not matched between, the spot deviates on the detection unit array. Due to the hardware connection limitation and space limitation of the detection unit array, there may a problem that there is not a detection unit at a proper position used for detecting the spot that is deviated.

For example, referring to FIG. 4 and related descriptions, it may be learnt that three consecutive columns of detection units may only be gated as a whole. For example, the last column of emitting units corresponds to the last three consecutive columns of detection units. Because the spot deviates by one column of detection units, only two columns of detection units of the three consecutive columns of detection units may detect the echo beam. However, there is no extra three consecutive columns of detection units in the detection unit array for adjustment. As a result, the spot that is paired with the last column of emitting units cannot be fully detected, resulting in the loss of an optical signal.

To resolve the problem of the hardware connection limitation and the space limitation of the detection unit array, the detection unit array may include: n groups of detection units, where $n=p*x+q$, both p and q represent positive integers, p represents a quantity of output ports of the addressing circuit, and $q \geq 0$. Further, to control a volume of the detection unit array, q may be less than x.

Therefore, by using the addressing circuit provided in this embodiment of this disclosure, the activation state of each group of detection units may be flexibly controlled, thereby avoiding the problem of hardware connection limitation. In addition, because an alternative group of detection units is reserved for the detection unit array, when adjusting the address selection correspondence, there may be enough groups of detection units to be selected, thereby effectively ensuring the quantity of optical signals detected by the lidar.

This disclosure further provides a lidar that is paired with the control method of the lidar. Referring to the accompanying drawings below, detailed descriptions are made through specific embodiments. It is to be understood that the content of the lidar described below may be referred to mutually and correspondingly with the content of the control method described above.

This disclosure further provides a lidar that is paired with the addressing circuit and the control method of the lidar. Referring to the accompanying drawings below, a detailed description is made through specific embodiments. It is to be understood that the content of the lidar described below may be referred to mutually and correspondingly with the addressing circuit and the content of the control method described above.

In an embodiment of this disclosure, with reference to FIG. 9, the lidar 90 includes: a control module 91, an addressing circuit 92 described in any one of the foregoing embodiments, an emitting module 93, and a receiving module 94. The control module 91 is respectively connected with the emitting module 93, the receiving module 94, and the addressing circuit 92, and the addressing circuit 92 is further connected with the receiving module 94.

The control module 91 is configured to generate an emitting control signal and transmit the emitting control signal to the emitting module 93; and according to an address of a starting group of detection units that is paired with an activated group of emitting units, generate a corresponding control signal for detection and transmit the control signal for detection to the addressing circuit 92, where the address of the starting group of the detection units is determined based on a result of a calibration process.

The emitting module 93 includes an emitting unit array, and the emitting unit array includes a plurality of groups of emitting units, such as the group of the emitting units 1 to the group of the emitting units V shown in FIG. 9. The emitting module is configured to receive the emitting control signal transmitted by the control module 91, and activate a corresponding group of emitting units to emit a detection beam.

The addressing circuit 92 is configured to perform a decoding process and a logic operation process on the control signal for detection, determine the address of the corresponding starting group of the detection units that has been processed by the calibration process, and determine addresses of other groups of detection units to be synchronously activated at the same time with the starting group of the detection units, determine a channel selecting address, and generate a selecting and controlling signal for corresponding channels.

The receiving module 94 includes a detection unit array, and the detection unit array includes a plurality of groups of detection units, such as the group of the detection units 1 to the group of the detection units W shown in FIG. 9. The receiving module 94 is configured to receive the channel selecting and controlling signal transmitted by the addressing circuit 92, and activate a corresponding group of detection units to perform photoelectric signal conversion of an echo beam.

By using the foregoing solution, the activation state of each group of detection units may be flexibly controlled, and the decoding process of the addressing circuit may reduce the quantity of bits of the control signal for detection, thereby reducing the quantity of input ports of the addressing circuit, and improving the channel selecting and controlling accuracy of the lidar. The photoelectric detection region activated of the receiving module may be dynamically adjusted according to actual conditions, and the addressing efficiency is higher, which is conducive to ensuring the accuracy and data volume of the result of lidar detection.

In a specific embodiment, the control module is configured to trigger the calibration process between the emitting module and the receiving module when a predetermined condition for calibration is met. The steps of the calibration process method may be performed by a functional unit (for example, a correction unit) in the control module 91, and may also be performed by other functional modules (for example, a correction module) triggered by the control module.

In actual applications, the lidar may be a solid-state lidar, for example, the lidar may be a Flash lidar. The emitting unit may include: a vertical-cavity surface-emitting laser (VC-SEL) and an edge emitting laser (EEL). The detection unit may include: a single photon avalanche diode (SPAD) array, a silicon photomultiplier (SiPM), and an avalanche photo diode (APD).

In a specific embodiment, each detection unit in the group of the detection units is synchronously activated or synchronously deactivated according to the received decoding logic level signal. Each emitting unit in the group of the emitting units is synchronously activated or synchronously deactivated according to the received emitting control signal.

In a specific embodiment, the detection unit in the group of the detection units may be arranged according to actual requirements, for example, may be arranged in a linear manner or a matrix manner, or the like. The linear arrangement manner be arranged in rows or arranged in columns, and a shape of the matrix arrangement manner may be a regular geometric shape (such as a rectangle, a triangle, or the like), or an irregular geometric figure. An arrangement manner of the detection units in the group of the detection units is not specifically limited in this embodiment of this disclosure.

Similarly, a light-emitting unit in the group of the emitting units may be arranged according to actual requirements, for example, may be arranged in a linear manner or a matrix manner. The linear arrangement manner may be arranged in rows or arranged in columns. A shape of the matrix arrangement manner may be a regular geometric figure (such as a rectangle, triangle, or the like), or an irregular geometry. An arrangement manner of the emitting units in the group of the emitting units is not specifically limited in this embodiment of this disclosure.

Embodiments of this disclosure further provide a storage medium. The storage medium may store one or more computer-executable instructions, and the one or more computer-executable instructions may be used for performing the control method of the lidar provided in the foregoing embodiments of this disclosure. In addition, the corresponding functional module in the lidar may invoke the computer-executable instructions in the storage medium to perform the control method of the lidar provided in the foregoing embodiment of this disclosure, where the corresponding functional module may be implemented by a processor. For details, reference may be made to the description of the foregoing embodiments, which is not repeated herein.

It may be understood that embodiments provided in this disclosure are only exemplary descriptions. According to actual application scenarios, the lidar may further include other hardware modules, hardware circuits, or the like. For example, the lidar may further include a receiving optical module, an emitting optical module, a processing module, a scanning module, various adaptation circuits, or the like, where the adaptation circuit may include: a signal reading circuit adapted to a detection unit array and a power supply circuit that supplies power for each module, or the like. A specific structure of the lidar is not limited in this disclosure.

It may be understood that a plurality of embodiment solutions provided in this disclosure are described above, and the optional manners introduced by the embodiment solutions may be mutually combined and cross-referenced in a case of no conflict, thereby extending a plurality of possible embodiment solutions, which may be considered as embodiment solutions disclosed and disclosed in this disclosure.

It is to be noted that the phrase "an embodiment", "one embodiment", or "embodiments" as used in this disclosure refers to a particular feature, structure, or characteristic that can be included in at least one implementation of this disclosure. In addition, in the description of this disclosure, the terms "first" and "second" are used merely for the purpose of description, and shall not be construed as indicating or implying relative importance or implying a quantity of indicated technical features. Therefore, a feature defined by the terms "first" or "second" can explicitly or implicitly includes one or more features. Moreover, the terms "first" and "second" are intended to distinguish between similar objects rather than describe a specific order or indicate importance. It may be understood that terms used in this way is exchangeable in a proper case, so that the present disclosure described herein can be implemented in an order different from the order shown or described herein.

Although the embodiments of this disclosure are disclosed above, the embodiments of this disclosure are not limited thereto. A person skilled in the art can make various changes and modifications without departing from the spirit and the scope of the embodiments of this disclosure. Therefore, the protection scope of the embodiments of this disclosure should be subject to the scope defined by the claims.

What is claimed is:

1. A control method of a lidar, comprising:

A1) acquiring an address of a starting group of detection units that is paired with a group of activated emitters in the lidar, and generating a control signal for detection for the starting group, wherein the address of the starting group of the detection units is determined based on a result of a calibration process;

A2) performing a decoding process and a logic operation process regarding the control signal for detection, determining the address of the starting group of the detection units that has been processed by the calibration process, determining addresses of other groups of detection units to be synchronously activated at the same time with the starting group of the detection units, determining a channel selecting address, and generating a selecting and controlling signal for corresponding channels; and A3) activating, based on the channel selecting and controlling signal, a corresponding group of detection units to perform photoelectric signal conversion of an echo beam.

2. The control method of the lidar according to claim 1, wherein the calibration process comprises the following method steps:

B1) activating a group of emitting units and a group of detection units of the lidar, respectively, that are paired during the calibration process;

B2) acquiring an electrical signal obtained by performing photoelectric signal conversion of the echo beam by the group of the detection units activated in step B1), and calculating an electrical signal strength that is paired with the activated group of detection units; and B3) acquiring an address that is paired with a group of detection units whose electrical signal strength meets a predetermined threshold for signal strength to obtain the address of the starting group of the detection units that is paired with the activated group of emitting units.

3. The control method of the lidar according to claim 2, wherein the step B3) comprises:

B31) sequentially determining, based on a predetermined sequence for reading signals, whether the electrical signal strength that is paired with the activated group of detection units meets the predetermined threshold for signal strength; and B32) determining an address that is paired with a group of detection units through which converted first electrical signal strength meets the predetermined threshold for signal strength to obtain the address of the starting group of the detection units that is paired with the activated group of emitting units.

4. The control method of the lidar according to claim 2, wherein before performing the calibration process, the method further comprises: determining that a predetermined condition for calibration is met.

5. An addressing circuit of a lidar, wherein the addressing circuit comprises a decoding module and a combination logic module, wherein the decoding module is configured to perform a decoding process regarding a received control signal for detection, determine an address of a starting group of detection units that has been processed by a calibration process that is paired with the control signal for detection, and transmit a corresponding decoding signal to the combination logic module, wherein the control signal for detection is generated based on the address of the starting group of the detection units that is paired with a group of activated emitters in the lidar, and the address of the starting group of the detection units is determined based on a result of a calibration process; and the combination logic module is configured to perform a logic operation process regarding a received decoding signal, determine addresses of other groups of detection units to be synchronously activated at the same time with the starting group of the detection units, form a channel selecting address with the address of the starting group of the detection units, and output a selecting and controlling signal for corresponding channels to a receiving module of the lidar to control activation of a corresponding group of detection units in the receiving module.

6. The addressing circuit of the lidar according to claim 5, wherein the decoding module comprises a plurality of input ports and a plurality of output ports, utilizes signals received in parallel through each input port as the control signal for detection, performs a decoding process on the control signal for detection, determines an address of a starting group of detection units that needs to be activated that is paired with the control signal for detection, and transmits a corresponding decoding signal to the combination logic module;

the combination logic module comprises a plurality of input ports and a plurality of output ports, the plurality of input ports of the combination logic module are respectively connected with different output ports of the decoding module, and the plurality of output ports of the combination logic module are respectively connected with enabling ports of different groups of detection units; and the combination logic module performs a logic operation process regarding the decoding signal outputted by the decoding module, determines the addresses of the other groups of detection units to be synchronously activated at the same time with the starting group of the detection units, forms the channel selecting address with the address of the starting group of the detection units, and outputs the selecting and controlling signal for corresponding channels to the receiving module of the lidar.

7. The addressing circuit of the lidar according to claim 6, wherein the combination logic module comprises a plurality of OR gates, and each OR gate respectively comprises a plurality of input ports and an output port;

an input port of each OR gate is used as the input port of the combination logic module and is connected with an output port of the decoding module at the corresponding position, and according to a connection sequence of the output port of the decoding module, other different input ports of each OR gate are further respectively connected with first $x-1$ output ports of the decoding module at the corresponding position; and as the output port of the combination logic module, the output port of each OR gate is respectively connected with a group of detection units, wherein x represents a quantity of groups of detection units to be synchronously activated.

8. The addressing circuit of the lidar according to claim 7, wherein one or more input ports of the plurality of OR gates that are not connected with the output port of the decoding module are all connected at a voltage of a low level.

9. The addressing circuit of the lidar according to claim 7, wherein the lidar comprises: n groups of detection units, wherein $n=p*x+q$, both p and q represent positive integers, p represents a quantity of output ports of the addressing circuit, and $q \geq 0$.

10. A lidar, comprising: a control module, an emitting module, a receiving module, and an addressing circuit, wherein the emitting module comprises a plurality of groups of emitting units, and the receiving module comprises a plurality of groups of detection units, wherein the control module is configured to generate an emitting control signal and transmit the emitting control signal to the emitting module; and according to an address of a starting group of detection units paired with an activated group of emitting units, generate a corresponding control signal for detection and transmit the control signal for detection to the addressing circuit, wherein the address of the starting group of the detection units is determined based on a result of a calibration process;

the emitting module is configured to receive the emitting control signal transmitted by the control module, and activate a corresponding group of emitting units to emit a detection beam;

the addressing circuit is configured to perform a decoding process and a logic operation process regarding the control signal for detection, determine the address of the corresponding starting group of detection units that has been processed by the calibration process, and determine addresses of other groups of detection units to be synchronously activated at the same time with the starting group of the detection units, determine a channel selecting address, and generate a selecting and controlling signal for corresponding channels; and the receiving module is configured to receive the channel selecting address and controlling signal transmitted by the addressing circuit, and activate a corresponding group of detection units to perform photoelectric signal conversion of an echo beam.

11. The lidar according to claim 10, wherein the control module is configured to trigger the calibration process between the emitting module and the receiving module when a predetermined condition for calibration is met.

\* \* \* \* \*